United States Patent
Bock et al.

(10) Patent No.: US 10,308,851 B2
(45) Date of Patent: Jun. 4, 2019

(54) ABRASIVE PARTICLE AND ABRASIVE EXHIBITING HIGH GRINDING PERFORMANCE

(71) Applicant: KLINGSPOR AG, Haiger (DE)

(72) Inventors: Irene Bock, Dillenburg (DE); Thomas Kamps, Holzwickede (DE)

(73) Assignee: KLINGSPOR AG, Haiger (DE)

( * ) Notice: Subject to any disclaimer, the term of this patent is extended or adjusted under 35 U.S.C. 154(b) by 157 days.

(21) Appl. No.: 15/103,138

(22) PCT Filed: Dec. 17, 2014

(86) PCT No.: PCT/DE2014/100453
§ 371 (c)(1),
(2) Date: Jun. 9, 2016

(87) PCT Pub. No.: WO2015/090283
PCT Pub. Date: Jun. 25, 2015

(65) Prior Publication Data
US 2016/0298013 A1    Oct. 13, 2016

(30) Foreign Application Priority Data
Dec. 19, 2013    (DE) .................... 10 2013 114 491

(51) Int. Cl.
*C09K 3/14*    (2006.01)
(52) U.S. Cl.
CPC ........ *C09K 3/1409* (2013.01); *C01P 2004/34* (2013.01)

(58) Field of Classification Search
None
See application file for complete search history.

(56) References Cited

U.S. PATENT DOCUMENTS

| | | | | |
|---|---|---|---|---|
| 1,871,793 A | * | 8/1932 | Horsfield | C01F 7/027 423/137 |
| 2,682,700 A | * | 7/1954 | Simoneau | B21D 53/44 29/899.1 |
| 4,111,713 A | * | 9/1978 | Beck | B29C 70/66 106/409 |
| RE29,808 E | * | 10/1978 | Wagner | B24D 7/00 51/296 |
| 5,213,591 A | * | 5/1993 | Celikkaya | B24D 3/16 51/293 |

(Continued)

FOREIGN PATENT DOCUMENTS

| CN | 102281992 A | 12/2011 |
|---|---|---|
| CN | 103702800 A | 4/2014 |

(Continued)

OTHER PUBLICATIONS

Jang, Dongchan et al. "Fabrication and deformation of three-dimensional hollow ceramic nanostructures" Nature Materials. vol. 12 (Sep. 1, 2013) pp. 893-898.*

(Continued)

*Primary Examiner* — Kaj K Olsen
*Assistant Examiner* — Ross J Christie
(74) *Attorney, Agent, or Firm* — Quarles & Brady LLP

(57) ABSTRACT

An abrasive particle (01) having a shell (02) and a hollow space (03) arranged within the shell (02) is proposed.

11 Claims, 2 Drawing Sheets

(56) References Cited

U.S. PATENT DOCUMENTS

| | | | |
|---|---|---|---|
| 5,653,775 A * | 8/1997 | Plovnick | C04B 35/1115 |
| | | | 51/309 |
| 7,632,434 B2 * | 12/2009 | Duescher | C09K 3/1436 |
| | | | 264/11 |
| 2003/0157868 A1 * | 8/2003 | Krupp | B23F 21/03 |
| | | | 451/47 |
| 2003/0196325 A1 * | 10/2003 | Pratt | A44C 11/00 |
| | | | 29/896.4 |
| 2005/0255801 A1 | 11/2005 | Pollasky | |
| 2006/0213225 A1 * | 9/2006 | Pratt | A44C 11/002 |
| | | | 63/3.1 |
| 2007/0293130 A1 * | 12/2007 | Miekka | B24D 3/346 |
| | | | 451/526 |
| 2008/0022718 A1 * | 1/2008 | Pratt | A44C 11/002 |
| | | | 63/3.1 |
| 2012/0167481 A1 | 7/2012 | Yener et al. | |
| 2013/0180180 A1 * | 7/2013 | Yener | C09K 3/1436 |
| | | | 51/309 |
| 2013/0212952 A1 | 8/2013 | Welygan et al. | |
| 2015/0087489 A1 * | 3/2015 | Sato | G03G 5/087 |
| | | | 492/18 |
| 2015/0089881 A1 * | 4/2015 | Stevenson | C09K 3/1409 |
| | | | 51/309 |

FOREIGN PATENT DOCUMENTS

| | | | | |
|---|---|---|---|---|
| DE | 23 49 326 A1 | 4/1974 | | |
| EP | 1 935 957 A1 | 6/2008 | | |
| GB | 1 452 372 A1 | 9/1976 | | |
| JP | 2001157968 A | 6/2001 | | |
| JP | 2005040873 A | 2/2005 | | |
| JP | 2006114861 A | 4/2006 | | |
| WO | 0038886 A1 | 7/2000 | | |
| WO | 03/018261 A2 | 3/2003 | | |
| WO | WO-03018261 A2 * | 3/2003 | | B24D 3/14 |
| WO | WO-2011087649 A9 * | 7/2011 | | B41M 1/12 |
| WO | 2012061033 A2 | 5/2012 | | |
| WO | 2013003830 A2 | 1/2013 | | |
| WO | 2014020068 A1 | 2/2014 | | |

OTHER PUBLICATIONS

PCT English Language Translation of the International Preliminary Report on Patentability, PCT/DE2014/100453, dated Jun. 30, 2016.
International Search Report dated Apr. 13, 2015 for International Application No. PCT/DE2014/100453.

* cited by examiner

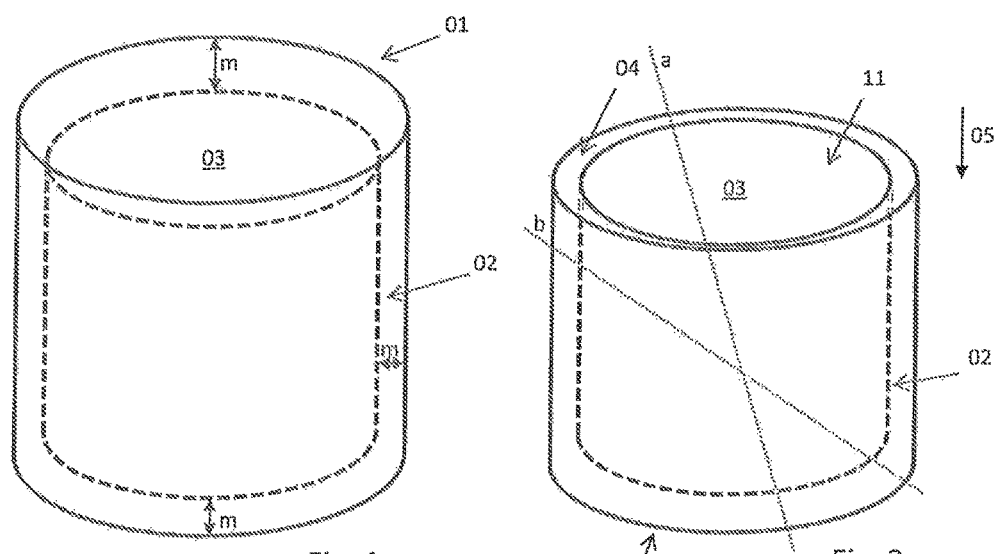
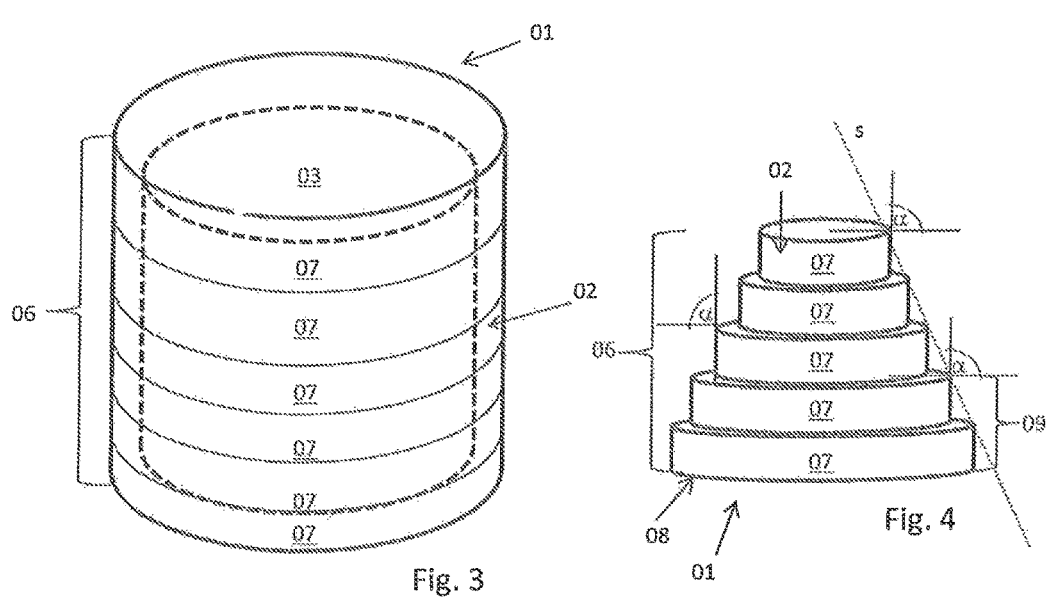

ABRASIVE PARTICLE AND ABRASIVE EXHIBITING HIGH GRINDING PERFORMANCE

CROSS-REFERENCE TO RELATED APPLICATIONS

This application represents the national stage entry of PCT International Application No. PCT/DE2014/100453 filed Dec. 17, 2014 and claims priority to German Patent Application No. 10 2013 114 491.8 filed Dec. 19, 2013. The contents of this application are hereby incorporated by reference as if set forth in their entirety herein.

The present invention relates to abrasive particles and to abrasives using the abrasive particles which exhibit high grinding performance.

Generic abrasive particles consist of ceramic materials, among other things, and are used to produce abrasives. The abrasives are used in turn to process and grind a material to be ground. Owing to the ceramic material properties, the ceramic abrasive particles are suitable for using and producing corresponding abrasives. Aside from the pure material properties, various other properties of the abrasive particles also play a significant role in the grinding performance of an abrasive, in particular by way of the working life of the abrasive and in terms of the wear of the abrasive and of the abrasive particles.

So far, the available abrasive particles are unsatisfying in terms of their grinding performance and especially in terms of the change in grinding performance in the course of wear.

Therefore, the object of the present invention is to enhance generic abrasive particles and abrasives using abrasive particles in such a way that improved grinding performance is achieved even though the abrasive particles wear continuously.

The basic idea of the present invention is to propose a hollow abrasive particle having a shell, the shell having a hollow space arranged within. In this way, a geometry of the abrasive particle is created that has various advantages over known solid abrasive particles. In solid abrasive particles, the surface of the abrasive particle that comes into contact with the material to be ground increases during the grinding process in the course of the wear of the abrasive particle as a function of the geometry of the abrasive particle and of the alignment of the abrasive particle with respect to the surface of the material to be ground. However, this increase of the surface leads to a reduction of grinding performance due to a corresponding decrease of the contact pressure on the material to be ground.

In contrast, the proposed abrasive particles having a shell and a hollow space arranged within the shell present the advantage that the increase of the surface coming into contact with the material to be ground during wear of the abrasive particle is limited by the presence of the hollow space. In other words, this means that the abrasive particles according to the invention retain a largely constant contact surface toward the respective material to be ground despite their wear, and a constant contact pressure is thus generated. In this way, stable grinding performance is made possible.

In this context, it is particularly advantageous if the hollow space is free of material residue of the production process. Such material residue is produced during the thermal decomposition of support material for supporting hollow spaces, for example, and can have an adverse effect on the grinding performance of the particles as far as the abrasive particles are concerned. Hence, it is a particular advantage of the abrasive particles if the hollow space is self-contained or self-supporting at any time during the production of the abrasive particles and thus no support material and material residue remaining therefrom is arranged in the hollow space of the abrasive particles.

It is particularly desirable for the abrasive particle to have a shell having a layer structure. For example, a layer structure allows producing an abrasive particle from different materials in alternating layers. On the one hand, alternating layers of this kind can have a positive impact on the mechanical stability of the abrasive particle. On the other hand, however, a layer structure made of identical or different materials can also improve grinding performance. This is especially true if particularly preferred geometries of the hollow-body abrasive particles are produced through the layer structure of the shell, which exhibit particularly high grinding performances and particularly constant grinding performances. Examples of such geometries comprising a shell and a hollow space arranged within include tetrahedrons, pyramids, cuboids, prisms, parallel-epipeds, cones, bottles, cylinders and polyhedrons of various forms in general, without excluding other geometries.

It is further advantageous if the shell of the abrasive particles has a largely constant shell thickness. The largely constant shell thickness allows the surface of the abrasive particle coming into contact with the material to be ground to remain largely constant independently of the respective alignment and the condition of wear of the abrasive particle. This, in turn, allows the grinding performance of the respective abrasive particle of an abrasive to remain largely constant.

Furthermore, grinding performance can be positively influenced if the inner surface of the shell and/or the outer surface of the shell have a stepped structure. The inner surface is the surface of the shell that is adjacent to the hollow space. Stepped structures of this kind lead to a plurality of spatial angles of 90° or less both on the inner surface and on the outer surface of the shell. Pointed edges of this kind on the shell surface or on the shell reduce the contact surface between the abrasive particle and the material to be ground. Accordingly, a stepped structure of the shell on the inner surface and/or on the outer surface improves the grinding performance of the abrasive particles. This improvement is possible as long as the contact pressure during grinding can be increased by reducing the contact surface and, moreover, as long as the abrasive effect remains homogenous across the surface in an abrasive particle of this kind having a stepped structure, which means that the increase in contact pressure does not have any negative effects on the distribution of the grinding performance across the surface.

In a particularly advantageous embodiment, the abrasive particles according to the invention are provided with a shell having a layer structure, the layers of the shell being formed in a multi-stage screen printing process. By means of such a multi-stage screen printing process, almost all geometries of abrasive particles having a hollow space arranged within can be realized. Additionally, a multi-stage screen printing process allows producing particularly thin layers of the shell, which makes even small or smallest abrasive particles having a shell and a hollow space correspondingly arranged within possible.

However, it is also possible to produce the abrasive particles by means of a device for three-dimensional printing and by way of a corresponding printing method (3D printing). Generic devices and methods are known from the field of rapid prototyping, for example.

Moreover, the stability and the grinding performance of the abrasive particles according to the invention is influenced especially positively if the hollow space is completely enclosed by the shell.

Alternatively, however, it may also be advantageous if the shell of the abrasive particle has two or more through holes toward the hollow space, the through holes being arranged in mutually different spatial directions. The perpendicular onto the shell or onto the imaginary shell at the location of a through hole should be seen as the spatial direction of the through hole in the shell toward the hollow space. Through holes of this kind toward the hollow space of the abrasive particle have different advantageous effects. On the one hand, they allow an even greater independence of the surface coming into contact with the material to be ground from the orientation or alignment between the abrasive particles and the material to be ground. Additionally, by correspondingly arranging through holes in different spatial directions, an abrasive particle can be produced with low material costs while still achieving a grinding performance comparable to similar abrasive particles without through holes.

It is particularly desirable for the through holes in the shell of the abrasive particle and the correspondingly remaining shell of the abrasive particle to be arranged to each other in such a manner that a beam structure is formed. Beam structures forming the edges of a polyhedron structure are particularly preferred. Beam structures of this kind also have the advantage that the surface of the abrasive particle coming into contact with the material to be ground is largely constant irrespective of the alignment and wear of the abrasive particle and is additionally very small as compared to corresponding solid abrasive particles. Accordingly, high grinding performance is made possible during the entire wear process of the abrasive particle, which does not yet have a negative effect on the distribution of the abrasive effect across the surface, either.

Furthermore, it is particularly advantageous if abrasive substances are arranged in the hollow space of the abrasive particles. Abrasive substances of this kind are materials that positively influence the grinding process upon contact with the material to be ground and/or the abrasive particle. It may be provided that the hollow spaces of abrasive particles both with and without through holes in the shell have abrasive substances of this kind. In case of abrasive particles having through holes toward the hollow space, however, it is particularly advantageous that the abrasive substances can be introduced into the abrasive particles in a dipping process or the like after the abrasive particles have been produced. Alternatively or additionally, however, it may also be provided that abrasive substances of this kind are contained at least in parts of the layers of the shell.

Moreover, it is especially desirable if the proposed abrasive particles are formed from a ceramic molding compound. In this way, the advantageous properties of ceramic abrasive particles can be combined with the above-described advantageous properties of the abrasive particles having a shell and a hollow space. Furthermore, it is particularly advantageous if the abrasive particles, in particular the shell of the abrasive particles, are formed from a gel of a sol-gel system.

Abrasives comprising abrasive particles according to the disclosure above and below are also a subject-matter of the invention. It may be provided that the abrasives have a substrate to which the abrasive particles are attached by means of a corresponding binder.

Individual embodiments and aspects of the abrasive particles and abrasives according to the invention will be illustrated hereinafter as examples by way of merely schematic drawings.

In the drawings:

FIG. 1 shows a first embodiment of an abrasive particle according to the invention;

FIG. 2 shows the abrasive particle of FIG. 1 in an exemplary condition of wear;

FIG. 3 shows a second embodiment of an abrasive particle according to the invention;

FIG. 4 shows a third embodiment of an abrasive particle according to the invention;

Figure 5:
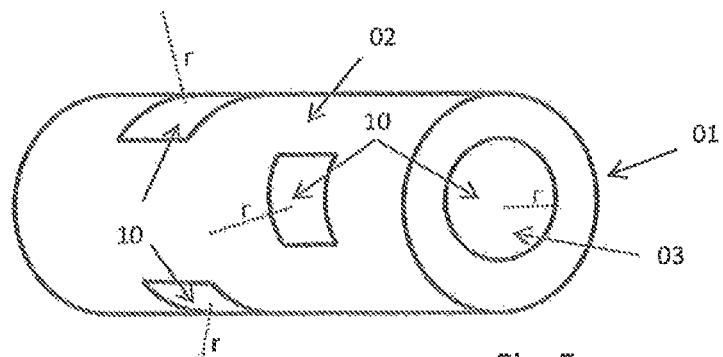
FIG. 5 shows a fourth embodiment of an abrasive particle according to the invention.

FIG. 1 shows an abrasive particle 01 having a shell 02. The dashed line in FIG. 1 additionally indicates the hollow space 03 of the abrasive particle 01 arranged within the shell 02. Moreover, the shell thickness m is indicated at different points of the abrasive particle 01. As can be taken from FIG. 1, the shell thickness m is largely constant across the entire abrasive particle 01. Thus, an abrasive particle as the one illustrated in FIG. 1 has the advantages that a continuous or at least sectionalized increase of the contact surface between the abrasive particle and a material to be ground during wear of the abrasive particle is largely limited or eliminated by the hollow space 03 arranged within. Still, the shell 02 of the abrasive particle 01 offers sufficient mechanical stabilization to withstand the forces occurring during the grinding process.

The advantages of a hollow space 03 within the shell 02 of an abrasive particle 01 are illustrated by way of example in FIG. 2. FIG. 2 shows the abrasive particle 01 of FIG. 1 in a partially worn or abraded state. The surface 04 of the shell 02 comes into contact with the material to be ground, which is not illustrated in FIG. 2, and generally causes a wear of the abrasive body 01 in the direction of arrow 05. It can easily be seen from FIG. 2 that the surface 04 is significantly reduced at one side as compared to a corresponding surface of a solid body without a hollow space 03, which already leads to a significant improvement of the grinding performance.

Also, it is clearly visible that the surface 04 will remain largely unchanged during further wear of the abrasive particle 01 in the direction of arrow 05, the overall high grinding performance of the abrasive particle 01 thus being maintained. While the surface 04 represents a specific direction or alignment in terms of the geometry of the abrasive particle 01, namely parallel to the bottom of the shell 02, it can be easily appreciated that the resulting properties, in particular the advantageous properties of the hollow space 03 as described above are realized to the same degree or at least to a highly similar degree when the material to be ground is in contact along the planes a and b indicated by dots. Thus, the advantages of the abrasive particles 01 according to to the invention do not depend on a specific alignment of the abrasive particles 01 toward the material to be ground. In fact, the very advantage of the abrasive particles 01 according to the invention comprising a shell 02 and a hollow space 03 arranged within the shell is that the grinding performance and the change of the grinding performance during wear of the abrasive particle 10 is rendered independent from the alignment to the material to be ground.

Furthermore, the inner surface 11 of the shell 02 limiting the hollow space 03 from the shell 02 is visible in the illustration of FIG. 2 as well.

The abrasive particle 01 of FIG. 3 substantially presents the same geometric shape as the abrasive particle 01 of FIG. 1. In contrast to FIG. 1, however, the shell 02 of the abrasive particle 01 consists of a layer structure 06, which is made up by the individual layers 07. As further illustrated in FIG. 3, it is possible but not absolutely necessary in case of such a layer structure 06 of the shell 02 to align the layers 07 of the layer structure 06 parallel to preferred axes of symmetry of the abrasive particle 01.

It may be additionally provided that the layers 07 of the layer structure 06 are made of different materials. Aside from ceramic materials, layers 07 made of abrasive substances are contemplated as well, for example. Moreover, abrasive particles of this kind have the advantage that they can be produced in the course of multi-stage screen printing processes, through which complex geometries and a particularly low individual layer thickness of the layers 07 can be achieved.

The abrasive particle 01 of FIG. 4 also has a shell 02 having a layer structure 06. The shell 02 completely encloses a hollow space, which is not illustrated or indicated in FIG. 4. Moreover, in addition to the layer structure 06 comprising the layers 07, the shell 02 has a stepped structure 09 on the outer surface 08 of the shell 02. The advantages of such a stepped structure 09 are the many resulting spatial angles α of the abrasive particles of 90° or less. The resulting spatial angles α of the stepped structure 09 lead to an alignment of the abrasive particle 01 toward a surface of a material to be ground, as outlined in FIG. 4 by dots through plane s, in which not the entire outer surface 08 of the shell 02 extending parallel to plane s comes into contact with the material to be ground, but only the points or edges of the stepped structure 09 of the shell 02. In this way, too, the abrasive surface of the abrasive particle 01 is accordingly rendered largely independent from the condition of wear and from the alignment of the abrasive particle, and the surface is additionally reduced further, which allows higher contact pressure. These two aspects benefit once more the increase of the grinding performance both momentarily and during wear of the abrasive particle 01. At the same time, the stepped structure does not adversely affect the uniformity of the grinding process with respect to the surface of the material to be ground. The inner surface of the abrasive particle 01, which is not illustrated in FIG. 4, can have a stepped structure as well.

FIG. 5 shows an abrasive particle 01 in which a total of four through holes 10 toward the hollow space 03 are present. The dotted lines r indicate the different spatial directions of the through holes 10 of the shell 02. Each of the spatial directions of the through holes 10 is to be understood as a perpendicular onto the shell or the imaginary shell at the location of the through hole 10. In FIG. 5, the different through holes 10 are thus arranged in different spatial directions to each other. Through holes of this kind can serve to actively increase the grinding performance of the abrasive particle by minimizing the contact surface between the abrasive particle and the material to be ground as long as an increased contact pressure is achieved in the process while the surface homogeneity of the abrasive process stays the same. Additionally, the through holes 10 also allow abrasive substances or materials to be arranged in the hollow space and on the inner surfaces or on the outer surfaces of the abrasive particle 01 in the course of a dipping process or dip coating, for example.

Figure 6:
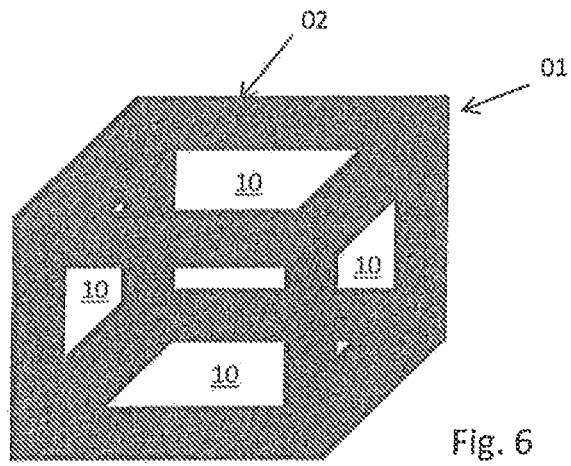
FIG. 6 shows a fifth embodiment of an abrasive particle according to the invention.

The abrasive particle 01 of FIG. 6 represents another variation. In addition to a shell 02, the abrasive particle 01 has a total of six through holes, the shell 02 forming a beam structure, which in turn forms or replicates the edges of a polyhedron, namely the edges of a cuboid or cube in the case at hand. The through holes 10 of the abrasive particle 01 of FIG. 6, too, are arranged overall in three mutually rectangular spatial directions. The illustrated beam structure also allows high grinding performance during the entire wear of the abrasive particle 01 and the entry of abrasive substances into the hollow space 03 at the same time. However, the term beam structure as used in the description at hand is not to be interpreted to only mean an arrangement as the one illustrated in FIG. 6. A shell in which the through holes 10 are significantly smaller than those in FIG. 6 is considered a beam structure, as well.

Figure 7:
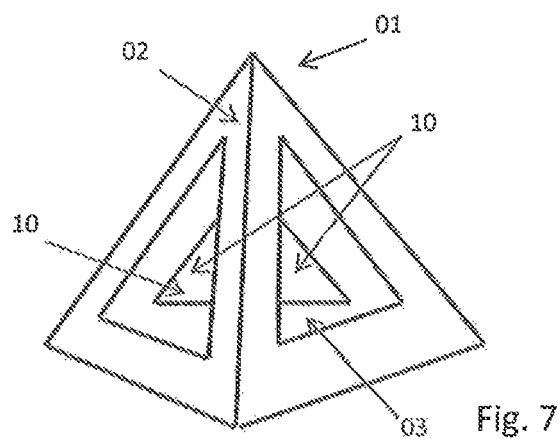
FIG. 7 shows a sixth embodiment of an abrasive particle according to the invention.

Another variation of an abrasive particle 01 is illustrated in FIG. 7. The shell 02 and the through holes 10 of the abrasive particle 01 of FIG. 7 form a beam structure, too. In the case of FIG. 7, the beams of the shell 02 form the edges of a tetrahedron, a hollow space 03 being present within the shell 02.

The invention claimed is:

1. An abrasive particle comprising:
   a shell, an inner surface of the shell and/or an outer surface of the shell having a stepped structure; and
   a hollow space arranged within the shell, the shell having a layer structure including a plurality of layers, and wherein abrasive substances are arranged in the hollow space.

2. The abrasive particle according to claim 1, in which the hollow space is free of material residue.

3. The abrasive particle according to claim 1, in which the shell has a constant shell thickness.

4. The abrasive particle according to claim 1, in which the stepped structure comprises at least three layers, each layer comprising a step of the stepped structure.

5. The abrasive particle according to claim 1, in which the layers of the shell are formed in a multi-stage screen printing process.

6. The abrasive particle according to claim 1, in which the hollow space is completely enclosed by the shell.

7. The abrasive particle according to claim 1, in which the shell has two or more through holes toward the hollow space, at least two through holes being arranged in mutually different spatial directions.

8. The abrasive particle according to claim 7, in which the shell and the through holes form a beam structure.

9. The abrasive particle according to claim 1, in which the shell is made from a ceramic molding compound.

10. The abrasive particle according to claim 1, in which the shell is formed from a gel of a sol-gel system.

11. An abrasive, in which the abrasive has abrasive particles according to claim 1.

* * * * *

UNITED STATES PATENT AND TRADEMARK OFFICE
CERTIFICATE OF CORRECTION

PATENT NO. : 10,308,851 B2
APPLICATION NO. : 15/103138
DATED : June 4, 2019
INVENTOR(S) : Irene Bock et al.

Page 1 of 1

It is certified that error appears in the above-identified patent and that said Letters Patent is hereby corrected as shown below:

In the Specification

Column 4, Line 60, "according to to the" should be --according to the--.

Signed and Sealed this
Twentieth Day of August, 2019

Andrei Iancu
*Director of the United States Patent and Trademark Office*